United States Patent [19]

Pierson et al.

[11] 4,072,738

[45] Feb. 7, 1978

[54] METHOD OF FORMING SHAPED ARTICLES

[75] Inventors: Robert M. Pierson, Hudson; John A. Lovell, Munroe Falls, both of Ohio

[73] Assignee: The Goodyear Tire & Rubber Company, Akron, Ohio

[21] Appl. No.: 549,421

[22] Filed: Feb. 12, 1975

Related U.S. Application Data

[63] Continuation of Ser. No. 198,762, Nov. 15, 1971, abandoned, which is a continuation-in-part of Ser. No. 722,918, April 22, 1968, abandoned.

[51] Int. Cl.² .......................... B29C 5/00; B29G 3/00
[52] U.S. Cl. ..................................... 264/102; 264/328
[58] Field of Search ....................... 264/102, 328, 329; 260/77.5 CR, 77.5 AA

[56] References Cited

U.S. PATENT DOCUMENTS

| 1,703,871 | 3/1929 | Curtis | 264/86 |
| 3,154,618 | 10/1964 | Baer et al. | 264/40 |
| 3,229,445 | 1/1966 | Kraft | 264/102 |
| 3,253,303 | 5/1966 | Bradt | 264/102 |
| 3,338,861 | 8/1967 | Mastin et al. | 260/77.5 CR |

OTHER PUBLICATIONS

Bernhardt, Processing of Thermoplastic Materials, Reinhold Pub. Corp., N.Y., (1959), pp. 10, 11, 15–19, 26, 27, 32 and 33.

Primary Examiner—Willard E. Hoag
Attorney, Agent, or Firm—F. W. Brunner; J. D. Wolfe

[57] ABSTRACT

This invention relates to a method of forming shaped articles utilizing liquid functional group polymers compounded with suitable compounding agents to produce mixtures of extremely viscous nature and moving these viscous mixtures to a shaping device without the entrapment of air.

6 Claims, 1 Drawing Figure

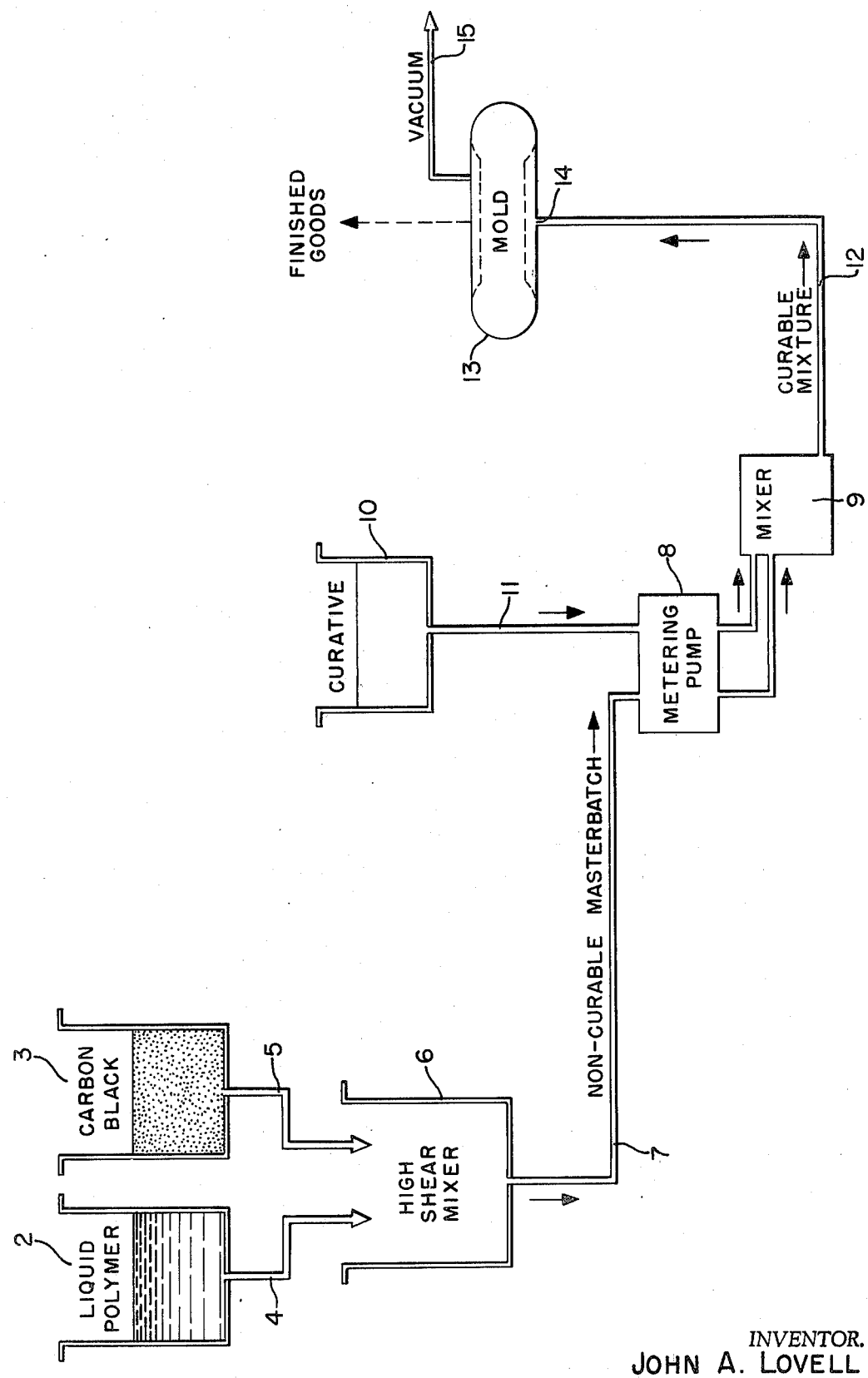

METHOD OF FORMING SHAPED ARTICLES

This is a continuation of Ser. No. 198,762 filed Nov. 15, 1971, which was a continuation-in-part of application Ser. No. 722,918, filed Apr. 22, 1968, both prior applications are now abandoned.

This invention relates to a method of forming shaped articles utilizing liquid functional group polymers compounded with suitable compounding agents which increase the viscosity of the mixture to the range of extremely viscous to even the pseudoplastic or thixotropic. More particularly, this invention relates to the use of fluidizable functional end group polymers containing compounding agents which materially affect the viscosity to form shaped articles free of entrapped air.

Heretofore shaped solid articles have typically been prepared by injection molding various thermoplastic materials in their liquid state under vacuum. The thermoplastic materials were typically melted prior to injection molding to a liquid state in order to exhibit a substantially Newtonion-type flow condition. The principal object was to avoid molding a pseudoplastic material and thus avoid excessive bubble formation and enhance the general flow pattern of the thermoplastic material within the mold.

In the manufacture of tires and other articles it is desired to be able to form the rubber properly compounded from initial liquid reactants in the shape of a tire or other manufactured articles without the necessity of first forming the rubber as a solid and then mixing the solid rubber with suitable compounding agents by the building steps such as mixing, milling or extruding and then utilizing related building steps to obtain the shaped article.

It is an object of this invention to provide a method for shaping commercial articles by utilizing liquid polymers having at least two reactive functional groups per molecule compounded with suitable compounding agents to give mixtures which are extremely viscous, to even the pseudoplastic or thixotropic states, and moving said viscous mixture into a shaping device to cure and obtain the finished article having the desired physical attributes.

This object and other advantages of this invention may be more readily understood by reference to the drawing wherein FIG. 1 is a schematic diagram of the mixing, metering and pumping equipment for shaping an article in accordance with this invention.

The objects of this invention and its advantages may be obtained by mixing a suitable liquid polymer of about 500 to 10,000 and preferably about 1000 to 4500 average molecular weight with suitable compounding agents to obtain a mixture which is relatively viscous, or even pseudoplastic or thixotropic, and moving the mixture under a pressure differential from the mixing chamber into a shaping device where the mixture is reacted to form a shaped article by increasing the polymer molecular weight until the resulting product is a solid at ambient temperature and then, if necessary, further curing to develop the optimum physical characteristics.

Representative of the many classes of liquid functional end group polymers that may be utilized are the hydroxyl or carboxyl terminated polymers containing a backbone formed by the polymerization or copolymerization of a conjugated diene of 4 to 8 carbon atoms per se or with a suitable alpha olefin of 2 to about 20 carbon atoms. Other suitable polymers are those formed by the cleavage of copolymers of sulfur and a conjugated diene of 4 to about 8 carbon atoms or the terpolymer of sulfur with a conjugated diene and an alpha olefin of about 2 to 20 carbon atoms to give cleaved products having active groups such as amine, hydroxyl or mercaptan as prepared by U.S. Pat. Nos. 3,338,875, 3,332,914, 3,338,874 and Ser. No. 578,171. Also, the polyesters and polyethers with appropriate end groups can be used in admixture with these to give desired variation in properties.

Of the many suitable compounding agents that may be used, representative examples are the organic polyisocyanates which are reactive with hydroxyls and other active hydrogen containing polymeric materials, or epoxy compounds, for instance, those formed by the reaction of epichlorhydrin with bis phenol A, and the free NCO containing liquid prepolymers of an organic polyisocyanate with organic polyamines or polyols where the free NCO content is about 1 to 20 percent by weight.

Representative of the many organic polyisocyanates that may be used in the practice of this invention are those that are well known commercially such as toluene diisocyanate, toluidine diisocyanate, methylene bis phenylene diisocyanate, hydrogenated cyclohexane diisocyanate, the aliphatic diisocyanates such as hexamethylene diisocyanate and the phosgenated products obtained by phosgenation of the reaction product of aniline and the lower aldehydes such as formaldehyde.

As the molecular weight of the liquifiable polymer containing reactive groups may vary it should be appreciated that the weight and mole ratio of the polymer to the reactants for curing will vary depending both on the molecular weight of the polymer and the nature of the polymer. Thus, where the liquid polymer contains hydroxyls, amino or mercaptan groups and the reactants compounded therewith are isocyanates, the mole ratio of isocyanates to the liquid polymer may vary from less than one mole per mole to as high as 1.5 and in some instances to as much as 5 or 7 moles per mole depending on the physical properties desired. Likewise where the liquid polymer contains carboxyl groups and is being reacted with an epoxy the ratio may vary from less than 1 to 1 to as much as 1 to 1.5. In general it has been noted that the properties of the cured product tend to be elastomeric where the liquid polymer has a molecular weight of at least about 700. In compounding the liquid polymer with compounding agents it was noted that the viscosity builds up extremely rapidly even where the reactive ingredients have not started to react. Therefore, it is possible to obtain a very viscous pseudoplastic mixture having a viscosity of about 350 to 630,000 poises or even 750,000 poises and higher at 60° C. temperature with the preferred range being about 100,000 to 350,000 poises, which retains its shape until subjected to a force greater than gravity. The extremely high viscosities of the mixtures present handling difficulties in preventing the entrapment of air and in filling the mold without the production of cavities due to the material reacting and setting up prior to the time the mold is fully filled.

Thus, the highly viscous built-up mixture can be molded as a pseudoplastic material rather than a more Newtonion-type liquid, while retaining its shape until subjected to a greater than gravitational force.

It is preferred that the suitable compounding agents, in addition to the reactive materials such as organic polyisocyanates, epoxy compound curatives, organic polyamines and the free NCO containing prepolymers, also contain suitable fillers, for instance, zinc oxide, calcium carbonate, carbon blacks, silica $TiO_2$ or clays and related fillers and a small amount of an extender such as the extender oils or a glycol. Included as a compounding agent is the catalyst for the isocyanate reaction and the epoxy reaction. Usually the carbon blacks may be utilized in the amount of about 5 to about 50 or more parts per 100 parts of liquid polymer without the mixture becoming so viscous that it is practically impossible to handle or to prevent the incorporation of air within the resulting mixture. It should be indicated that if air is incorporated within the mixture it becomes extremely difficult to obtain a shaped article that is nonporous and free of air bubbles.

Where the fillers being used are carbon blacks it is preferred to wet the carbon blacks such as the LASF type with a small amount of processing or extender oil, as this permits a dispersion of the black in the liquid polymer to be obtained more readily. Normally it is preferred that the mixing be done at a vacuum varying from 20 to 28 inches of mercury to insure that the mixture is free of incorporated air and thereby give a finished molded article which is nonporous.

As the temperature of the mixing is raised it should be appreciated that the viscosity of the curable masterbatch will accordingly be lowered and the amount of carbon black that can be safely handled in the mixing and pumping steps will be increased.

Referring to FIG. 1 of the drawings the numeral 2 represents a storage container for liquid polymers having reactive groups and the numeral 3 represents a storage containing for solid fillers such as carbon black. The storage tanks 2 and 3 are connected by suitable feed lines 4 and 5 respectively to a high shear mixer 6. Thus, the liquid polymer and the carbon black are fed to the high shear mixer where the carbon black is incorporated into the liquid polymer to form a mixture which is hereinafter referred to as the noncurable masterbatch. The noncurable masterbatch is fed by line 7 to a proportioning pump 8 and from there to a mixer 9 where it is mixed with a curative from the curative tank 10 which is likewise fed by the line 11 through the proportioning pump 8 to the mixer 9. In the mixer 9 the noncurable masterbatch and the curative from tank 10 are mixed to form a curable mixture which is pumped by the line 12 to the mold 13, and the curable mixture enters the underside 14 of the mold by line 12 to fill the mold which is held under a vacuum by a vacuum means (not shown) associated with flexible vacuum line 15. The curable mixture in the mold is allowed to react until it is set and then the mold is opened to permit the set and shaped articles to be removed. Where necessary the set and shaped article can be set to a preliminary heat treatment to further cure it or it can be sent to the finished goods storage depending on the nature of the product being formed.

Representative examples of the many embodiments of this invention are set forth in the examples below where all parts are by weight unless otherwise designated:

EXAMPLE I

A high shear mixer having connection to a charging line of a pressurized mixing unit having a tank for the carbon black loaded liquid functional group polymer, and a tank for a curative, was used to make a filler loaded polymer. In this example a hydroxyl terminated polybutadiene (essentially difunctional) of about 3000 molecular weight was charged to the high shear mixer along with sufficient HAF carbon black to give a mixture containing 30 parts carbon black per hundred parts of liquid functional end group polymer. A vacuum was placed on the mixing chamber of the high shear mixer to effectively incorporated the HAF carbon black within the liquid polymer without incorporating air. Then the mixture of the liquid polymer and HAF black was fed to the holding tank of the injection molding unit and from there to a mixer where it was contacted and effectively mixed with toluene diisocyanate and a catalyst. At this point the valve on the line from the mixer to the shaping device, in this case, a mold for a solid tire, was opened and the mixture allowed to flow into the bottom part of the mold, held under vacuum, with a positive pump pressure of about 5 to 3000 p.s.i. and preferably about 10 to 100 p.s.i. but sufficient to move the polymer, being applied to the mixture per se. When the filling of the tire mold from the underside was completed, the valve was closed to stop the charging of material to the mold. The mold was placed in a curing oven at 250° F. for about 15 minutes to effectively cure the reaction mixture. Then the mold was opened and the solid tire was removed therefrom.

EXAMPLE II

A liquid carboxyl terminated polybutadiene having a bulk viscosity of about 21 poises at 25° C. and an acid equivalent weight of 1966 was charged to the mixing unit of a high shear mixer maintained under a high vacuum, less than 100 millimeters of mercury, along with HAF carbon black to form a 2 percent by weight black loaded polymer which was free of incorporated air or gas. This black loaded polymer was charged to the pressure mixer above with a curative to form a reaction mixture which was charged simultaneously to a mold from the underside thereof by a suitable pressure differential, usually about 20 to 100 pounds per square inch (p.s.i.) developed by maintaining a positive pressure on the mixer and a vacuum on the mold.

The curative is a mixture of 1.0 equivalent weight of a tri-epoxide formed by reacting epichlorohydrin with para aminophenol, 0.3 equivalent weights diglycidyl ether of bisphenol A, 3.7 percent by weight of a hydrocarbon extender oil on a carboxylic polybutadiene polymer basis, and 0.5 percent of a tertiary methylamine substituted phenol on the carboxylic polybutadiene polymer basis.

This curative was charged to the pressure mixer at a rate to give about 1.3 equivalent weights of epoxy compound for each equivalent weight of the carboxylic polybutadiene polymer.

The vacuum on the mold was taken when the mold was filled and the filling line was disconnected and the reaction mixture in the mold was heated to 250° F. to set the liquid and then the set material was cured at 300° F. for 1.5 hours to obtain a shaped article having the contour of a solid tire.

EXAMPLE III

A series of black loaded tires were made according to the procedure of Example I at a loading level of 25 parts of HAF carbon black per 100 parts of functional end group polymer. The tensile and elongation values were determined on the cured product and the results of these tests are shown in Table 1:

Table 1

| Polymer | Molecular Weight | Physicals on Cured Product | |
|---|---|---|---|
| | | Tensile psi | Elongation % |
| Hydroxyl terminated polybutadiene | 2200–2500 | 1300 | 450 |
| Hydroxyl terminated polybutadiene | 3000–3500 | 1256 | 121 |
| Hydroxyl terminated copolymer of styrene/butadiene (25–75%) | 2200–2500 | 1750 | 450 |

Incorporation of the carbon black in the liquid functional end group polymer at temperatures of about 200°–250° F. was achieved easily and the physical properties of the cured product was improved relative to lower temperature incorporation. A small amount of a catalyst such as a tertiary amine or an organic tin compound gave faster reaction rates. Therefore about 0.05 to 1.5 percent of catalyst may be used where improved reaction rates are desired.

Another advantage observed in making shaped articles in accordance with this invention relative to the solid polyurethane thermal injection method is the horsepower of the motors driving the pumps and the mixers are reduced to about one-thirtieth. Thus, this method permits lower price equipment to be used as the pressures are lower and such lower pressures require less power, although the production capacity is equally as high as with the thermal injection of thermoplastic polymers.

EXAMPLE IV

Another series of runs were made according to the procedure of Example I using dibutyl tin dilaurate (0.05%) by weight and tetraethylene pentamine as catalyst with various functional end group polymers and varying carbon black levels. The phsyical properties on these series are shown in Table 2:

While certain representative embodiments and details have been shown for the purpose of illustrating the invention, it will be apparent to those skilled in this art that various changes and modifications may be made therein without departing from the spirit or scope of the invention.

What is claimed is:

1. In a method of forming a shaped article comprising mixing a liquid polymer containing functional end groups with a suitable compounding agent that yields a mixture capable of Newtonion flow at the mixing temperature and moving the mixture under a pressure differential of 10 to 3000 pounds per square inch to a shaper and curing, the improvement wherein the mixture is subjected to mixing in a vacuum in a high shear mixer to convert the mixture from a Newtonion to a non-Newtonion mixture at the mixing temperature, mixing a curative in the non-Newtonion mixture and moving the mixture to shaper at a viscosity at the mixing temperature expressed as 100,000 to 750,000 poises at 60° C.

2. The method of claim 1 wherein said polymer is a polymer of a diene or a copolymer diene and an alpha olefin having hydroxyl or carboxyl functional groups.

3. The method of claim 1 wherein one of the compounding agents is reactive with the functional groups of the polymer to give a solid polymer of increased molecular weight.

4. The method of claim 1 wherein the polymer containing functional end group is selected from the class consisting of hydroxyl terminated polydiene and an organic isocyanate.

5. The method of claim 1 wherein the polymer containing functional end groups is selected from the class consisting of hydroxyl terminated polybutadiene and hydroxyl terminated copolymer of styrene butadiene.

6. The method of claim 5 wherein the compounding agent is carbon black.

* * * * *

Table 2

Physical Data on Product at Varying Diluent and Carbon Black Levels

| Hydroxyl Polymer Identification | Diluent Level Volume %* | Toluene Diisocyanate Parts | Black Level Parts/100 Parts Polymer | 100% Modulus PSI | Tensile I.S.I. | Elongation % |
|---|---|---|---|---|---|---|
| Polybutadiene 2300 molecular weight | 0 | 6.7 | 25 | 352 | 918 | 221 |
| | 4.4 | 6.7 | 25 | 398 | 765 | 174 |
| | 5.4 | 6.7 | 25 | 222 | 542 | 218 |
| Polybutadiene 3300 molecular weight | 0 | 8.1 | 25 | 815 | 890 | 111 |
| | 3.2 | 8.1 | 25 | 803 | 857 | 109 |
| | 4.6 | 8.1 | 25 | 444 | 610 | 136 |
| Polybutadiene Acrylonitrile | 0 | 5.7 | 0 | 141 | 170 | 141 |
| | 4.4 | 5.7 | 0 | 138 | 205 | 196 |
| | 0 | 5.7 | 25 | 519 | 983 | 152 |
| | 4.4 | 5.7 | 25 | 447 | 916 | 161 |
| | 0 | 4.9 | 40 | 702 | 1349 | 159 |
| | 5.9 | 4.9 | 40 | 658 | 1308 | 153 |

* a liquid cis polybutadiene.

UNITED STATES PATENT AND TRADEMARK OFFICE
CERTIFICATE OF CORRECTION

PATENT NO. : 4,072,738
DATED : February 7, 1978
INVENTOR(S) : Robert M. Pierson and John A Lovell It is certified that error appears in the above--identified patent and that said Letters Patent are hereby corrected as shown below:

In Column 3, Line 16 "LASF" should be --IASF--.

In Column 3, Line 32 "containing" should be --container--.

Signed and Sealed this

Tenth Day of October 1978

[SEAL]

Attest:

RUTH C. MASON
*Attesting Officer*

DONALD W. BANNER
*Commissioner of Patents and Trademarks*